(12) United States Patent
Takahashi et al.

(10) Patent No.: US 11,171,546 B2
(45) Date of Patent: Nov. 9, 2021

(54) MOTOR (71) Applicant: NIDEC SERVO CORPORATION, Kiryu (JP)

(72) Inventors: Ryotaro Takahashi, Kiryu (JP); Koji Mizukami, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 83 days.

(21) Appl. No.: 16/636,078

(22) PCT Filed: Sep. 18, 2018

(86) PCT No.: PCT/JP2018/034331
§ 371 (c)(1),
(2) Date: Feb. 3, 2020

(87) PCT Pub. No.: WO2019/065336
PCT Pub. Date: Apr. 4, 2019

(65) Prior Publication Data
US 2021/0167669 A1 Jun. 3, 2021

(30) Foreign Application Priority Data
Sep. 29, 2017 (JP) .............................. JP2017-191854

(51) Int. Cl.
*H02K 9/22* (2006.01)
*H02K 11/33* (2016.01)
(Continued)

(52) U.S. Cl.
CPC .............. *H02K 9/227* (2021.01); *H02K 5/22* (2013.01); *H02K 9/22* (2013.01); *H02K 11/30* (2016.01);
(Continued)

(58) Field of Classification Search
CPC .......... H02K 9/227; H02K 5/22; H02K 11/33; H02K 2211/03; H02K 11/30; H02K 9/22;
(Continued)

(56) References Cited

U.S. PATENT DOCUMENTS

2012/0025746 A1* 2/2012 Kawakubo ............. H02K 11/33
318/400.25
2013/0119834 A1 5/2013 Nakagami et al.
(Continued)

FOREIGN PATENT DOCUMENTS

JP 2013-211126 A 10/2013
JP 2013211126 A * 10/2013

OTHER PUBLICATIONS

Maeyama Ken, Teminal Fitting and Motor with Terminal Fitting, Oct. 10, 2013, Fujitsu General LTD, JP 2013211126 (English Machine Translation) (Year: 2013).*
(Continued)

*Primary Examiner* — Quyen P Leung
*Assistant Examiner* — Alexander A Singh
(74) *Attorney, Agent, or Firm* — Keating & Bennett (57) ABSTRACT

A motor includes a cover including a first cup body and a second cup body, each including a bottomed tubular shape. The first cup body and the second cup body are disposed with openings of the peripheral wall portions facing each other. The second cup body includes a bottom wall portion provided with stud bolts projecting from the bottom wall portion to one axial direction and spaced apart from each other in a circumferential direction. An end surface of a heat sink, facing the one axial direction, is in contact with a portion positioned between the stud bolts adjacent to each other in the circumferential direction in a surface of the bottom wall portion of the second cup body in the other axial direction.

9 Claims, 7 Drawing Sheets (51) Int. Cl.
  *H02K 5/22* (2006.01)
  *H02K 11/30* (2016.01)
  *F25B 31/02* (2006.01)

(52) U.S. Cl.
  CPC ............ *H02K 11/33* (2016.01); *F25B 31/026* (2013.01); *H02K 2211/03* (2013.01)

(58) Field of Classification Search
  CPC ............ H02K 5/18; H02K 3/522; H02K 5/00; H02K 5/02; H02K 5/04; H02K 5/06; H02K 5/08; H02K 5/15; H02K 5/16; H02K 5/161; H02K 9/223; H02K 5/1732; H02K 11/38; F25B 31/026
  USPC ............... 310/89, 68 R, 68 D, 51, 52, 53, 64
  See application file for complete search history.

(56) References Cited

U.S. PATENT DOCUMENTS

2014/0035405 A1* 2/2014 Mao .................. H02K 5/10
                                                    310/71
2021/0139070 A1* 5/2021 Tateyama ................ C09K 5/14

OTHER PUBLICATIONS

Official Communication issued in corresponding Chinese Patent Application No. 201880050184.9, dated Jul. 1, 2021.

* cited by examiner

MOTOR

CROSS REFERENCE TO RELATED APPLICATIONS

This is a U.S. national stage of PCT Application No. PCT/JP2018/034331, filed on Sep. 18, 2018, and priority under 35 U.S.C. § 119(a) and 35 U.S.C. § 365(b) is claimed from Japanese Application No. 2017-191854, filed Sep. 29, 2017; the entire disclosures of each which are hereby incorporated herein by reference.

FIELD OF THE INVENTION

The present disclosure relates to a motor.

BACKGROUND

A conventional inverter-integrated electric compressor includes a housing in which the compressor and the electric motor are built, a control circuit board having a heat conduction penetrating member, and an electric component mounted on the control circuit board. The heat conduction penetrating member has one end surface disposed allowing heat transfer to the heat radiating planar portion constituting an outer wall of the housing. The heat conduction penetrating member has the other end surface disposed with the electric component allowing heat transfer.

A stud bolt may be provided in a cover of a motor. The motor is attached to a device frame or the like, to which the motor is to be attached, using the stud bolt. Such a motor has room for improvement in that an integrated circuit on a circuit board is efficiently cooled.

SUMMARY

An example embodiment of a motor of the present disclosure includes a rotor including a motor shaft extending along a central axis, a stator radially facing the rotor with a gap, a circuit board positioned in one axial direction of the stator, including a board surface mounted with an integrated circuit, disposed facing the one axial direction, a heat sink disposed in the one axial direction from the circuit board, in thermal contact with the integrated circuit, and a cover accommodating the rotor, the stator, the circuit board, and the heat sink, the cover including a first cup body and a second cup body that are each in a bottomed tubular shape, the first cup body and the second cup body each including a bottom wall portion, and a peripheral wall portion in a tubular shape extending axially from an outer peripheral edge of the bottom wall portion, the first cup body and the second cup body being disposed with openings in the peripheral wall portions, facing each other, the bottom wall portion of the first cup body being provided with a shaft insertion hole that axially passes through the bottom wall portion, the bottom wall portion of the second cup body being provided with a plurality of stud bolts projecting from the bottom wall portion toward the one axial direction, spaced apart from each other in a circumferential direction, and the heat sink including an end surface facing the one axial direction, being in contact with a portion positioned between the stud bolts adjacent to each other in the circumferential direction in a surface of the bottom wall portion of the second cup body in the other axial direction.

The above and other elements, features, steps, characteristics and advantages of the present disclosure will become more apparent from the following detailed description of the example embodiments with reference to the attached drawings.

DETAILED DESCRIPTION

As illustrated in FIGS. 1 to 5, a motor 1 of the present example embodiment includes a cover 5, a stud bolt 22, a wiring member 50, a rotor 2 having a motor shaft 3 extending along a central axis J, and a stator 4, a pair of bearings 7, a circuit board 20, a heat radiating member 24, a heat sink 21, and a screw member 25. The motor shaft 3 has both end portions including a first end portion where an output end 3a is positioned is disposed outside the cover 5. The output end 3a is connected to a fan or the like (not illustrated) that is rotated by the motor 1.

In the present example embodiment, a direction parallel to the central axis J is simply referred to as "axial direction". A direction from the first end portion of the both end portions of the motor shaft 3, where the output end 3a is positioned, toward a second end portion different from the first end portion is referred to as one axial direction. The one axial direction is shown in the left side of FIGS. 4 and 5. A direction from the second end portion of the motor shaft 3 toward the first end portion thereof is referred to as the other axial direction. The other axial direction is shown in the right side of FIGS. 4 and 5. A radial direction about the central axis J is simply referred to as "radial direction". The radial direction includes a direction approaching the central axis J that is referred to as radially inside, and a direction away from the central axis J that is referred to as radially outside. A circumferential direction about the central axis J is simply referred to as "circumferential direction".

Figure 4:
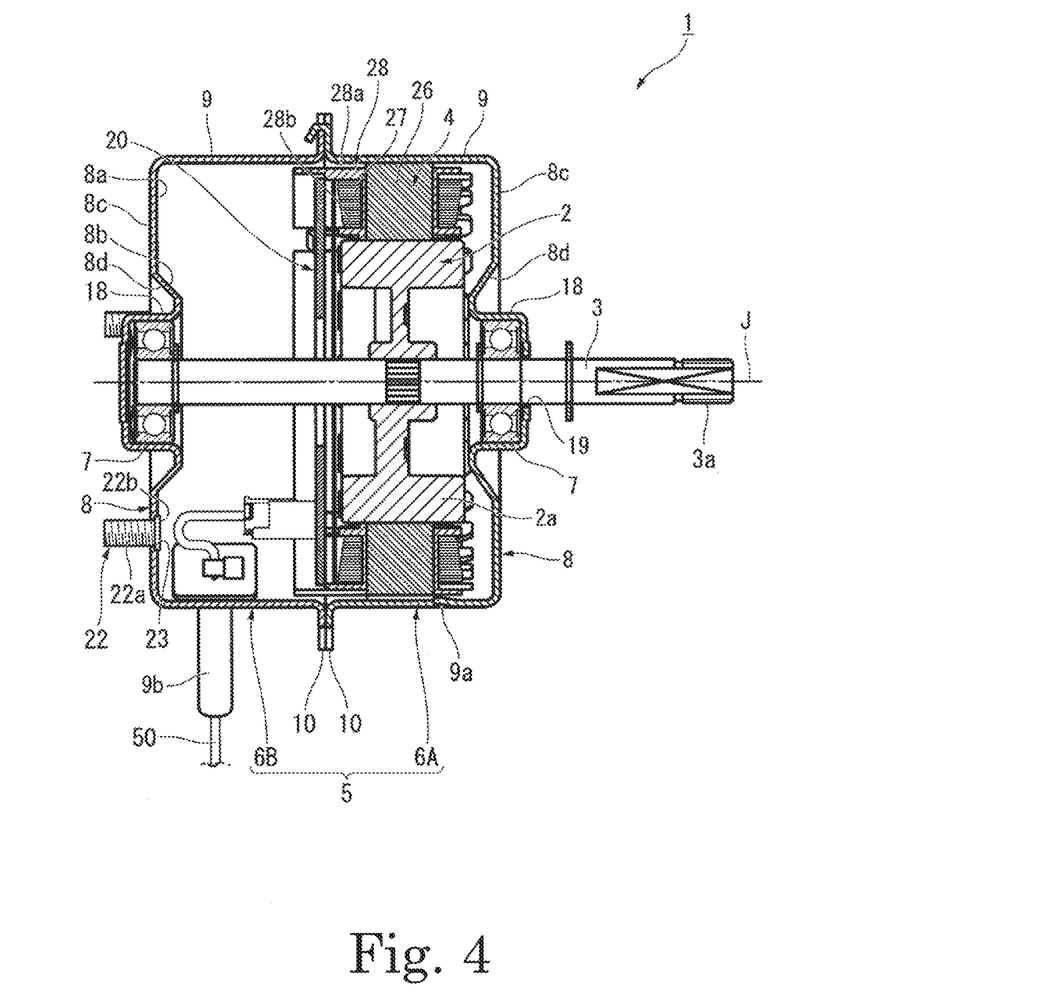
FIG. 4 is a cross-sectional view illustrating a cross section taken along line IV-IV in FIG. 3.
Figure 5:
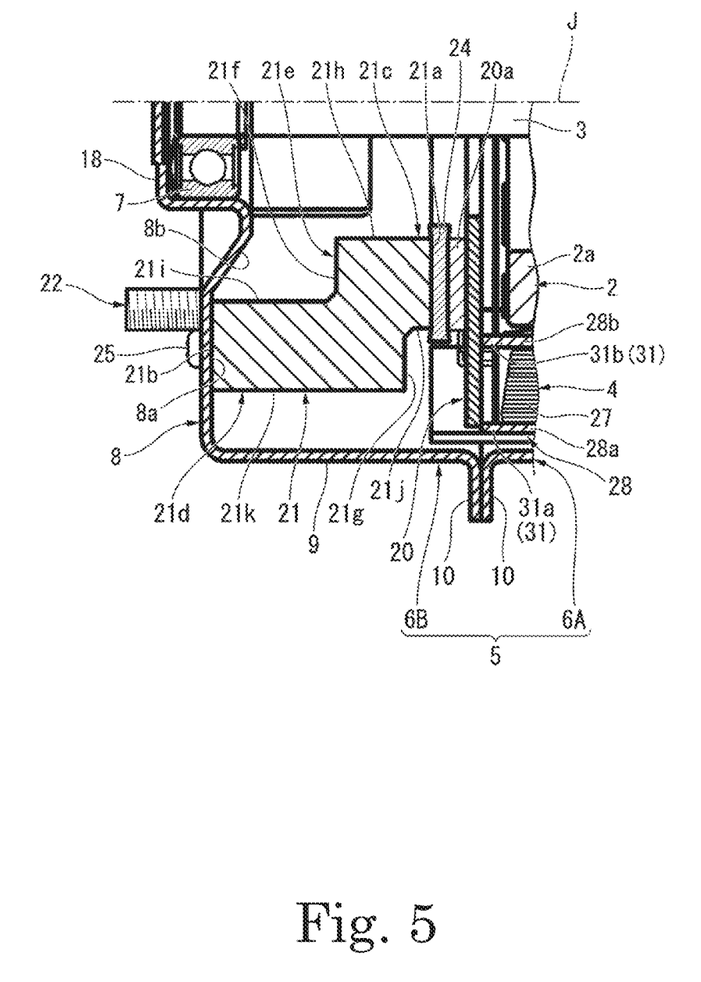
FIG. 5 is a cross-sectional view illustrating a cross section taken along line V-V in FIG. 3.

As illustrated in FIGS. 4 and 5, the cover 5 accommodates the rotor 2, the stator 4, the bearings 7, the circuit board 20, and the heat sink 21. The cover 5 includes a first cup body 6A and a second cup body 6B. The cover 5 has the first cup body 6A and the second cup body 6B that are each in a bottomed tubular shape. The first cup body 6A and the second cup body 6B are each in a bottomed cylindrical shape about the central axis J. In an example of the present example embodiment, the first cup body 6A accommodates a rotor magnet 2a described below of the rotor 2, the stator 4, and one bearing positioned in the other axial direction of the pair of bearings 7. The second cup body 6B accommodates, one bearing 7 positioned in the one axial direction of the pair of bearings 7, the circuit board 20, the heat sink 21, and the heat radiating member 24.

As illustrated in FIG. 4, the cover 5 is made of sheet metal. At least the second cup body 6B of the first cup body 6A and the second cup body 6B is made of sheet metal. In the example of the present example embodiment, the first cup body 6A and the second cup body 6B are made of sheet metal. The first cup body 6A and the second cup body 6B are each made of a steel plate, for example. The first cup body 6A and the second cup body 6B are identical to each other in axial dimension and radial dimension. The first cup body 6A and the second cup body 6B are press-formed into a cup shape using the same die. That is, the first cup body 6A and the second cup body 6B are each a press-formed product. The cover 5 is a press cover.

The first cup body 6A is positioned in the other axial direction from the second cup body 6B. The second cup body 6B is positioned in the one axial direction from the first cup body 6A. The first cup body 6A opens toward the one axial direction. The second cup body 6B opens toward the other axial direction. The first cup body 6A and the second cup body 6B each have a bottom wall portion 8, a peripheral wall portion 9, and a flange portion 10. The first cup body 6A and the second cup body 6B are disposed with openings in the peripheral wall portions 9, facing each other. The first cup body 6A and the second cup body 6B are fixed to each other with their openings facing each other in the axial direction. The flange portion 10 of the first cup body 6A and the flange portion 10 of the second cup body 6B face each other in the axial direction and are in contact with each other. The first cup body 6A and the second cup body 6B have the respective flange portions 10 that are fixed to each other. In a state where the first cup body 6A and the second cup body 6B are fixed to each other, the inside of the first cup body 6A and the inside of the second cup body 6B communicate with each other.

The bottom wall portion 8 includes a bearing holding portion 18, a flat portion 8c, and a connection portion 8d. The bearing holding portion 18 has a bottomed tubular shape. The bearing holding portion 18 has the bottomed cylindrical shape about the central axis J. The bearing holding portion 18 opens toward the inside of the cover 5. The bearing holding portion 18 holds the bearing 7. The bearing 7 is a ball bearing or the like, for example. The bearing 7 is fitted into the bearing holding portion 18 and fixed. In the cover 5, the pair of bearings 7 is disposed apart from each other in the axial direction. The pair of bearings is disposed at respective ends of the cover 5 in the axial direction. The pair of bearings 7 rotatably supports the motor shaft 3. The bearing 7 supports the motor shaft 3 in a rotatable manner around the central axis J.

The bottom wall portion 8 of the first cup body 6A is provided with a shaft insertion hole 19 that passes through the bottom wall portion 8 in the axial direction. The shaft insertion hole 19 is provided in the bearing holding portion 18 of the first cup body 6A. The shaft insertion hole 19 is a through hole that passes through a bottom of the bearing holding portion 18. The motor shaft 3 is inserted into the shaft insertion hole 19. The motor shaft 3 passes through the shaft insertion hole 19 and projects from the inside of the cover 5 to the outside.

The flat portion 8c has a ring shape and extends in the circumferential direction. The flat portion 8c has an annular plate-like shape about the central axis J. The flat portion 8c has a plate surface that faces in the axial direction and that spreads in a direction perpendicular to the central axis J. The flat portion 8c is disposed radially outward from the bearing holding portion 18. The flat portion 8c surrounds the bearing holding portion 18 from radially outside. The flat portion 8c is disposed at a position overlapping the bearing holding portion 18 as viewed radially. The flat portion 8c is connected to the peripheral wall portion 9. The flat portion 8c is connected at its outer edge portion to an end portion of the peripheral wall portion 9, opposite to an opening thereof along the axial direction.

The bottom wall portion 8 of the second cup body 6B is provided with a through hole 23. The second cup body 6B has a plurality of the through holes 23 passing through the bottom wall portion 8 in the axial direction. The through hole 23 is a circular hole, for example. The through hole 23 is provided in the flat portion 8c of the second cup body 6B. The through hole 23 passes through the flat portion 8c of the second cup body 6B in the axial direction. The plurality of the through holes 23 is disposed in the bottom wall portion 8, spaced apart from each other in the circumferential direction. The plurality of the through holes 23 is disposed in the flat portion 8c at equal intervals in the circumferential direction.

The bottom wall portion 8 of the second cup body 6B is provided with a plurality of the stud bolts 22. The stud bolt 22 projects from the bottom wall portion 8 of the second cup body 6B to the one axial direction. The plurality of the stud bolts 22 is disposed on the bottom wall portion 8, spaced apart from each other in the circumferential direction. In the present example embodiment, the bottom wall portion 8 of the second cup body 6B is provided with three or more stud bolts 22 spaced apart from each other in the circumferential direction. In the illustrated example, four stud bolts 22 are provided on the bottom wall portion 8 at equal intervals in the circumferential direction. The plurality of the stud bolts 22 is disposed in the flat portion 8c, spaced apart from each other in the circumferential direction. The stud bolt 22 is inserted into the through hole 23 and attached to the bottom wall portion 8. The stud bolt 22 is press-fitted into the through hole 23 and fixed to the flat portion 8c. The motor 1 is attached and fixed to a device frame or the like (not illustrated), to which the motor 1 is to be attached, using the stud bolt 22.

The stud bolt 22 has a bolt portion 22a and a head portion 22b. The bolt portion 22a has a pillar shape extending in the axial direction. The bolt portion 22a has a cylindrical columnar shape. The bolt portion 22a is inserted into the through hole 23. The bolt portion 22a passes through the through hole 23 to project to the one axial direction. The bolt portion 22a projects from the bottom wall portion 8 to the one axial direction. The bolt portion 22a has an end portion in the other axial direction, being fitted into the through hole 23. The bolt portion 22a is provided with a thread portion at least in a portion other than the end portion in the other axial direction. In the example illustrated in FIG. 4, the thread portion is provided over the entire axial length of the bolt portion 22a. The thread portion has a male screw on its outer circumference. The thread portion is exposed to the outside of the cover 5.

The head portion 22b has a plate-like shape. The head portion 22b has a disk-like shape coaxial with the bolt portion 22a. The head portion 22b has an outer diameter larger than that of the bolt portion 22a. The head portion 22b is connected to an end portion of the bolt portion 22a in the other axial direction. The head portion 22b is in contact with the bottom wall portion 8 from the other axial direction. The head portion 22b is in contact with the bottom wall portion 8 from the inside of the motor. The head portion 22b is in contact with a flat surface 8*a* (described later) of the flat portion 8*c* from the other axial direction. The head portion 22*b* projects from the flat portion 8*c* in the other axial direction by a dimension of 1 mm or less, for example. In the example of the present example embodiment, the head portion 22*b* projects from the flat portion 8*c* in the other axial direction by a dimension of 0.3 to 0.4 mm.

The bottom wall portion 8 of the second cup body 6B is provided with a screw mounting hole (not illustrated). The second cup body 6B has the screw mounting hole that passes through the bottom wall portion 8 in the axial direction. The screw mounting hole is a circular hole, for example. A plurality of the screw mounting holes is provided in the flat portion 8*c* of the second cup body 6B. The screw mounting hole passes through the flat portion 8*c* of the second cup body 6B in the axial direction. The plurality of the screw mounting holes is disposed in the bottom wall portion 8, spaced apart from each other in the circumferential direction. Two screw mounting holes are provided. Into the screw mounting hole, the screw member 25 described later is inserted.

The connection portion 8*d* connects the bearing holding portion 18 and the flat portion 8*c*. The connection portion 8*d* connects an opening of a cylindrical portion of the bearing holding portion 18 and an inner peripheral edge of the flat portion 8*c*. The connection portion 8*d* is disposed between the bearing holding portion 18 and the flat portion 8*c*. The connection portion 8*d* is positioned between the bearing holding portion 18 and the flat portion 8*c* along the radial direction. In the example of the present example embodiment, the connection portion 8*d* has a tapered tubular shape about the central axis J. The connection portion 8*d* extends toward an opening side of the peripheral wall portion 9 along the axial direction as extending radially inward from the flat portion 8*c*. That is, the connection portion 8*d* of the first cup body 6A extends toward the one axial direction as extending radially inward from the flat portion 8*c*. The connection portion 8*d* of the second cup body 6B extends toward the other axial direction as extending radially inward from the flat portion 8*c*.

The bottom wall portion 8 of the second cup body 6B has a surface facing the other axial direction, including the flat surface 8*a* and a connection surface 8*b*. The flat surface 8*a* is disposed on the flat portion 8*c* of the second cup body 6B. The flat surface 8*a* faces the other axial direction in the flat portion 8*c* of the second cup body 6B. The flat surface 8*a* has a ring shape perpendicular to the central axis J. The flat surface 8*a* has an annular surface shape extending in a direction perpendicular to the central axis J. The flat surface 8*a* is disposed at a radial position radially outward from the bearing holding portion 18. The flat surface 8*a* surrounds the bearing holding portion 18 from radially outside.

The connection surface 8*b* is disposed in the connection portion 8*d* of the second cup body 6B. The connection surface 8*b* faces the other axial direction in the connection portion 8*d* of the second cup body 6B. The connection surface 8*b* connects the bearing holding portion 18 and the flat surface 8*a*. The connection surface 8*b* connects the opening of the cylindrical portion of the bearing holding portion 18 and an inner peripheral edge of the flat surface 8*a*. The connection surface 8*b* is disposed between the bearing holding portion 18 and the flat surface 8*a*. The connection surface 8*b* is positioned between the bearing holding portion 18 and the flat surface 8*a* along the radial direction. In the example of the present example embodiment, the connection surface 8*b* has a tapered surface shape about the central axis J. The connection surface 8*b* extends toward the one axial direction from the bearing holding portion 18 as extending radially outward.

The peripheral wall portion 9 has a tubular shape about the central axis J. The peripheral wall portion 9 has a cylindrical shape. The peripheral wall portion 9 extends in the axial direction from an outer peripheral edge of the bottom wall portion 8. The peripheral wall portion 9 opens on the side opposite to the bottom wall portion 8 along the axial direction. At an end portion of the peripheral wall portion 9 on the side opposite to the bottom wall portion 8 along the axial direction, an opening is positioned. The peripheral wall portion 9 has an end portion opposite to the opening along the axial direction that is closed by the bottom wall portion 8.

The peripheral wall portion 9 of the first cup body 6A is provided with a plurality of stator support claws 9*a*. The stator support claws 9*a* project from the peripheral wall portion 9 into the first cup body 6A. The plurality of stator support claws 9*a* is disposed on the peripheral wall portion 9, spaced apart from each other in the circumferential direction. The stator support claws 9*a* are in contact with the stator 4 disposed in the first cup body 6A from the other axial direction. The stator support claws 9*a* support the stator 4 toward the one axial direction.

The peripheral wall portion 9 of the second cup body 6B has a bush 9*b*. The bush 9*b* has a tubular shape. The bush 9*b* is elastically deformable. The peripheral wall portion 9 of the second cup body 6B is provided with a wiring through hole (not illustrated) that passes through the peripheral wall portion 9 in the radial direction. The bush 9*b* is inserted into the wiring through hole and fixed to the peripheral wall portion 9. The outside and inside of the cover 5 communicate with each other through the inside of the bush 9*b*. The wiring member 50 is allowed to pass through the bush 9*b*. The wiring member 50 passes through the bush 9*b* and extends outside and inside the cover 5. The bush 9*b* is provided at its radially inner end with a wiring outlet (not illustrated). That is, the peripheral wall portion 9 of the second cup body 6B has the wiring outlet. The wiring outlet opens inside the cover 5. The wiring member 50 passes through the bush 9*b* and projects into the cover 5 from the wiring outlet. The wiring member 50 is electrically connected to the circuit board 20.

The flange portion 10 has a ring shape that extends radially outward from an end edge of the peripheral wall portion 9 opposite to the bottom wall portion 8. The flange portion 10 has an annular plate-like shape that extends radially outward from an end portion of the peripheral wall portion 9 opposite to the bottom wall portion 8, along the axial direction. The flange portion 10 has a plate surface that faces in the axial direction and that spreads in a direction perpendicular to the central axis J. The plate surface of the flange portion 10 of the first cup body 6A, facing the one axial direction and the plate surface of the flange portion 10 of the second cup body 6B, facing the other axial direction, are in contact with each other. The first cup body 6A and the second cup body 6B are disposed with the flange portions 10 in contact with each other in the axial direction.

The rotor 2 has the motor shaft 3 and the rotor magnet 2*a*. The motor shaft 3 has a portion supported by the pair of bearings 7 and a portion positioned between the pair of bearings 7, the portions being disposed inside the cover 5. The motor shaft 3 has a portion positioned in the other axial direction from the bearing 7 accommodated in the first cup body 6A, the portion being disposed outside the cover 5. The motor shaft 3 and the pair of bearings 7 are prevented from moving in the axial direction by a retaining ring or the like. The rotor magnet 2a has a tubular shape about the central axis J. The rotor magnet 2a has a cylindrical shape. The rotor magnet 2a is fixed to an outer peripheral surface of the motor shaft 3.

The stator 4 is fitted into the cover 5. The stator 4 is fitted and fixed to an inner peripheral surface of the peripheral wall portion 9 of the first cup body 6A. The stator 4 faces the rotor 2 with a gap in the radial direction. The stator 4 faces the rotor 2 from radially outside. The stator 4 includes a stator core 26, a coil 27, an insulating part 28, and a binding pin (not illustrated). The stator core 26 has a ring shape that surrounds a radially outer side of the rotor 2. The stator core 26 faces the rotor magnet 2a with a gap in the radial direction. The stator core 26 faces the rotor magnet 2a from radially outside.

The coil 27 is attached to the stator core 26. The coil 27 is attached to the stator core 26 indirectly with the insulating part 28 interposed therebetween. The insulating part 28 has a portion disposed between the stator core 26 and the coil 27. The insulating part 28 has a portion radially facing the coil 27. That is, the insulating part 28 radially faces the coil 27. The insulating part 28 includes an outer peripheral insulating portion 28a positioned radially outside the coil 27 and an inner peripheral insulating portion 28b positioned radially inside the coil 27. The outer peripheral insulating portion 28a faces the coil 27 from radially outside. The inner peripheral insulating portion 28b faces the coil 27 from radially inside. To the outer peripheral insulating portion 28a, the circuit board 20 is attached and fixed.

As illustrated in FIG. 5, the insulating part 28 has a circuit board receiver 31 in contact with the circuit board 20 from the other axial direction. The circuit board receiver 31 includes an outer peripheral circuit board receiver 31a and an inner peripheral circuit board receiver 31b. The outer peripheral circuit board receiver 31a is in contact with an outer peripheral portion in a surface of the circuit board 20 in the other axial direction. The outer peripheral circuit board receiver 31a is in contact with the circuit board 20 radially outward from the coil 27 from the other axial direction. The outer peripheral circuit board receiver 31a is provided in the outer peripheral insulating portion 28a. A plurality of the outer peripheral circuit board receivers 31a is provided in the outer peripheral insulating portion 28a, spaced apart from each other in the circumferential direction. That is, the insulating part 28 includes the plurality of the outer peripheral circuit board receivers 31a.

The inner peripheral circuit board receiver 31b is in contact with the surface of the circuit board 20 in the other axial direction radially inward from the coil 27. The inner peripheral circuit board receiver 31b is in contact the circuit board 20 from the other axial direction radially inward from the coil 27. The inner peripheral circuit board receiver 31b is provided in the inner peripheral insulating portion 28b. A plurality of the inner peripheral circuit board receivers 31b is provided in the inner peripheral insulating portion 28b, spaced apart from each other in the circumferential direction. That is, the insulating part 28 has the plurality of the inner peripheral circuit board receivers 31b.

Although not illustrated, the binding pin extends from the insulating part 28 in the one axial direction and passes through the circuit board 20 in the axial direction. The binding pin is provided on the outer peripheral insulating portion 28a. A plurality of the binding pins is provided in the outer peripheral insulating portion 28a, spaced apart from each other in the circumferential direction. The binding pin is disposed between the outer peripheral circuit board receivers 31a adjacent to each other in the circumferential direction. The binding pin is wound with coil lead wires (not illustrated) extending from the coil 27. Four coil lead wires are provided. The four coil lead wires are used for a U phase, a V phase, a W phase, and a neutral point. Four binding pins are provided. The binding pins are identical in number to the coil lead wires. That is, four sets of the coil lead wire and the binding pin are provided. The binding pin has an end portion in the one axial direction with the coil lead wire, being fixed to a surface of the circuit board 20 facing the one axial direction by solder (not illustrated).

As illustrated in FIGS. 4 and 5, the circuit board 20 is positioned in the one axial direction from the stator 4. The circuit board 20 is electrically connected to the stator 4. The circuit board 20 is electrically connected to the coil lead wires of the coil 27. The circuit board 20 is positioned in the one axial direction from the rotor magnet 2a. The circuit board 20 is disposed at a position overlapping the stator 4 and the rotor magnet 2a as viewed from the axial direction. The circuit board 20 is surrounded by the outer peripheral insulating portion 28a from radially outside. The circuit board 20 is disposed at a position overlapping the outer peripheral insulating portion 28a as viewed from the radial direction. In the example of the present example embodiment, the circuit board 20 is disposed at a position overlapping the flange portion 10 of the second cup body 6B as viewed from the radial direction. The circuit board 20 has a disk-like shape. The circuit board 20 has an annular plate-like shape about the central axis J. The circuit board 20 has a board surface that faces the axial direction and that spreads in a direction perpendicular to the central axis J. The motor shaft 3 extends in the axial direction radially inside the circuit board 20.

As illustrated in FIG. 5, the board surface of the circuit board 20 is mounted with an integrated circuit 20a and a capacitor (not illustrated). The circuit board 20 is disposed with the board surface mounted with the integrated circuit 20a, facing the one axial direction. The integrated circuit 20a has a quadrangular plate-like shape. The integrated circuit 20a has a rectangular plate-like shape having a circumferential length larger than its radial length. The integrated circuit 20a has a board surface facing the axial direction. The board surface of the integrated circuit 20a has a rectangular shape having a circumferential length larger than its radial length. The integrated circuit 20a is disposed radially inward away from an outer peripheral edge of the circuit board 20. The binding pin is disposed between the outer peripheral edge of the circuit board 20 along the radial direction and the integrated circuit 20a.

The capacitor is mounted on the board surface of the circuit board 20, facing the one axial direction. The capacitor has a cylindrical columnar shape. The capacitor extends in the axial direction. The capacitor has a surface that faces the one axial direction and that faces the bottom wall portion 8 of the second cup body 6B from the axial direction. The surface of the capacitor facing the one axial direction is disposed with a gap with a surface of the bottom wall portion 8, facing the other axial direction.

The heat radiating member 24 is sandwiched between the heat sink 21 described later and the integrated circuit 20a. The heat radiating member 24 is elastically deformable. The heat radiating member 24 has a plate-like shape. The heat radiating member 24 has a rectangular plate-like shape. The heat radiating member 24 has a rectangular plate-like shape having a circumferential length larger than its radial length. The heat radiating member 24 has a plate surface that faces the axial direction and that spreads in a direction perpendicular to the central axis J. The plate surface of the heat radiating member 24 has a rectangular shape having a circumferential length larger than its radial length.

The heat radiating member 24 has a plate surface facing the other axial direction, in contact with the integrated circuit 20a. The plate surface of the heat radiating member 24, facing the other axial direction, is in contact with a board surface of the integrated circuit 20a, facing the one axial direction. The plate surface of the heat radiating member 24, facing the other axial direction, has a surface area larger than a surface area of the board surface of the integrated circuit 20a, facing the one axial direction. The board surface of the integrated circuit 20a, facing the one axial direction, is covered with the plate surface of the heat radiating member 24, facing the other axial direction. The heat radiating member 24 has a plate surface facing the one axial direction, in contact with the heat sink 21. The plate surface facing the one axial direction of the heat radiating member 24 is in contact with an end surface 21a of the heat sink 21, facing the other axial direction. The plate surface of the heat radiating member 24, facing the one axial direction, has a surface area larger than a surface area of the end surface 21a. The end surface 21a is covered with the plate surface of the heat radiating member 24, facing the one axial direction.

The heat sink 21 is disposed in the one axial direction from the circuit board 20. The heat sink 21 is in thermal contact with the integrated circuit 20a. The heat sink 21 is in thermal contact with the integrated circuit 20a with the heat radiating member 24 interposed therebetween. The heat sink 21 is fixed to the cover 5. The heat sink 21 is attached and fixed to the second cup body 6B. The heat sink 21 is fixed to the bottom wall portion 8 of the second cup body 6B.

Figure 6:
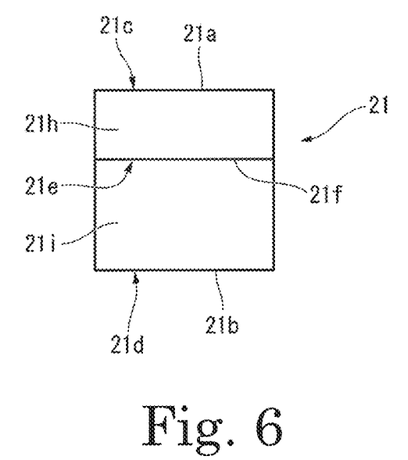
FIG. 6 is a front view of a heat sink as viewed from radially inside.

As illustrated in FIGS. 5 and 6, the heat sink 21 has a first end portion 21c, a second end portion 21d, and a bent portion 21e. The first end portion 21c is an end portion of the heat sink 21 in the other axial direction. The first end portion 21c is in thermal contact with the integrated circuit 20a. The first end portion 21c presses the integrated circuit 20a toward the other axial direction. The first end portion 21c has a rectangular parallelepiped shape. The first end portion 21c has a circumferential length larger than its radial length.

The first end portion 21c has an end surface 21a facing the other axial direction, a surface 21h facing the radial inside, and a surface 21j facing the radial outside. That is, the heat sink 21 has the end surface 21a facing the other axial direction. The end surface 21a has a quadrangular shape. The end surface 21a has a rectangular shape. The end surface 21a has a circumferential length larger than its radial length. The end surface 21a is in contact with the heat radiating member 24 from the one axial direction. The end surface 21a has a surface area that is substantially equal to a surface area of the board surface of the integrated circuit 20a, facing the one axial direction. The end surface 21a is disposed at a position overlapping the heat radiating member 24 and the integrated circuit 20a as viewed from the axial direction. The end surface 21a has a peripheral portion disposed at a position that substantially overlaps a peripheral portion of the integrated circuit 20a as viewed from the axial direction.

The surface 21h has a quadrangular shape. The surface 21h has a rectangular shape. The surface 21h has a circumferential length larger than its axial length. The surface 21j has a quadrangular shape. The surface 21j has a rectangular shape. The surface 21j has a circumferential length larger than its axial length.

The second end portion 21d is an end portion of the heat sink 21 in the one axial direction. The second end portion 21d has a rectangular parallelepiped shape. The second end portion 21d has a circumferential length larger than its radial length. The second end portion 21d is in contact with the bottom wall portion 8 of the second cup body 6B. The second end portion 21d is in contact with the flat portion 8c of the bottom wall portion 8 from the other axial direction. The second end portion 21d is in contact with the flat surface 8a.

The second end portion 21d is disposed at a radial position radially outward from the first end portion 21c. That is, the second end portion 21d is disposed with a radial center position radially outward from a radial center position of the first end portion 21c. The second end portion 21d has a radially inner end positioned radially outward from a radially inner end of the first end portion 21c. The second end portion 21d has a radially outer end positioned radially outward from a radially outer end of the first end portion 21c.

The second end portion 21d has an end surface 21b facing the one axial direction, a surface 21i facing the radial inside, and a surface 21k facing the radial outside. That is, the heat sink 21 has the end surface 21b facing the one axial direction. The end surface 21b has a quadrangular shape. The end surface 21b has a rectangular shape. The end surface 21b has a circumferential length larger than its radial length. The end surface 21b has a surface area equal to or larger than the surface area of the end surface 21a. That is, the surface area of the end surface 21b is equal to or larger than the surface area of the end surface 21a.

Figure 3:
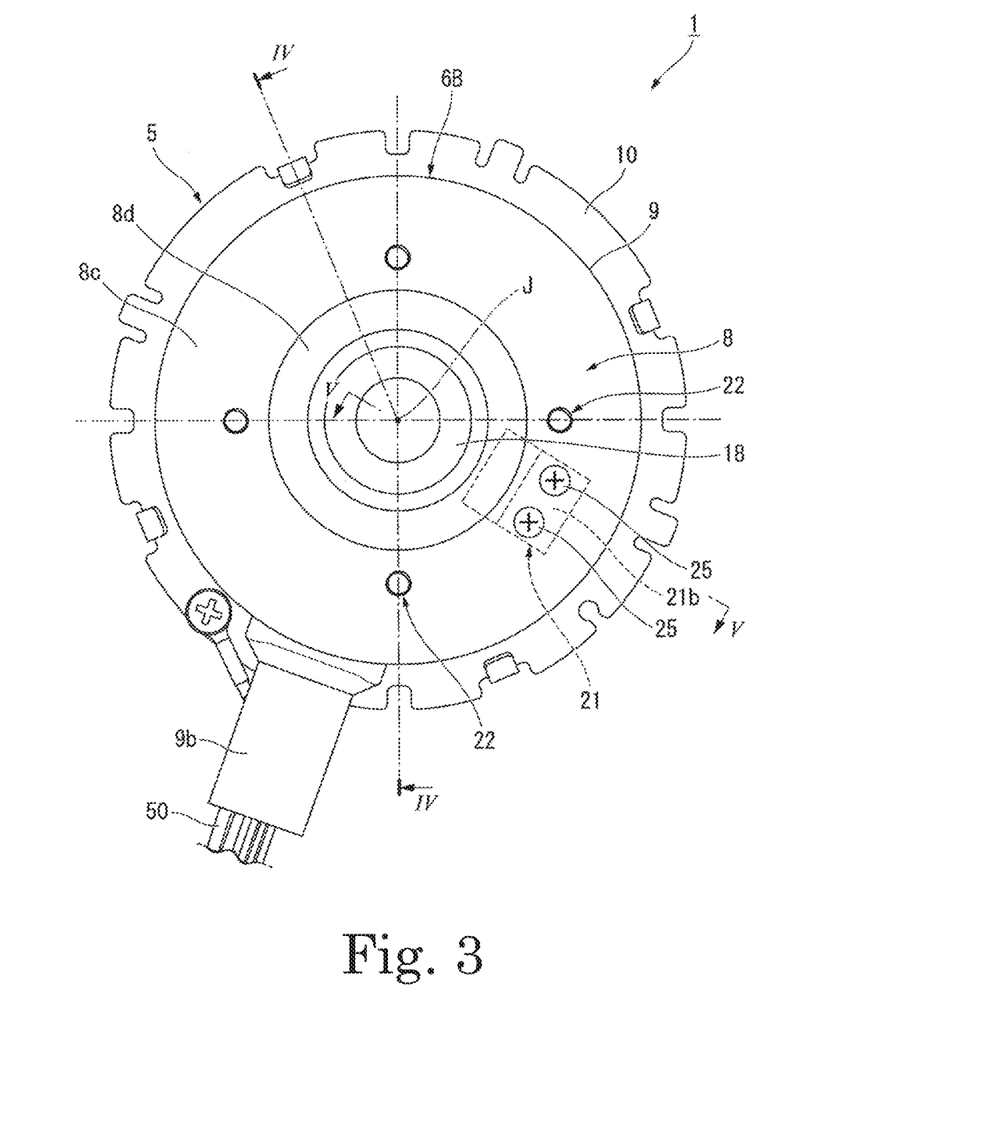
FIG. 3 is a plan view of the motor according to an example embodiment of the present disclosure as viewed from the other axial direction.

The end surface 21b is in contact with the bottom wall portion 8 of the second cup body 6B from the other axial direction. As illustrated in FIG. 3, the end surface 21b is in contact with a portion positioned between the stud bolts 22 adjacent to each other in the circumferential direction in a surface of the bottom wall portion 8 of the second cup body 6B in the other axial direction. The end surface 21b is in contact with a portion positioned between the head portions 22b adjacent to each other in the circumferential direction in the surface of the bottom wall portion 8 of the second cup body 6B in the other axial direction (refer to FIGS. 4 and 5). As illustrated in FIG. 5, the end surface 21b is in contact with the flat surface 8a of the flat portion 8c. That is, the second end portion 21d is in contact with the flat surface 8a. The second end portion 21d is disposed at a position overlapping the flat surface 8a as viewed from the axial direction.

Although not illustrated, the end surface 21b is provided with a screw hole. That is, the second end portion 21d has the screw hole. The screw hole opens in the end surface 21b and extends in the axial direction. The screw hole is provided in its inner periphery with a female thread. A plurality of the screw holes is provided in the second end portion 21d. The plurality of the screw holes is disposed in the second end portion 21d, spaced apart from each other in the circumferential direction. Two screw holes are provided. The screw member 25 described later is inserted into the screw hole and fixed.

As illustrated in FIGS. 5 and 6, the surface 21i has a quadrangular shape. The surface 21i has a rectangular shape. The surface 21i has a circumferential length larger than its axial length. The surface 21i is disposed at a radial position radially outward from the surface 21h. The surface 21k has a quadrangular shape. The surface 21k has a rectangular shape. The surface 21k has a circumferential length larger than its axial length. The surface 21k is disposed at a radial position radially outward from the surface 21j.

The bent portion 21e is a portion positioned between both the end portions 21c and 21d of the heat sink 21 in the axial direction. The bent portion 21e is an intermediate portion positioned between both the end portions 21c and 21d of the heat sink 21 in the axial direction. That is, the bent portion 21e is disposed at an intermediate position between the first end portion 21c and the second end portion 21d in the axial direction. The bent portion 21e connects the first end portion 21c and the second end portion 21d.

The bent portion 21e has a first step surface 21f and a second step surface 21g. That is, the heat sink 21 has the first step surface 21f and the second step surface 21g. The first step surface 21f connects the surface 21h and the surface 21i. The first step surface 21f faces the one axial direction. The first step surface 21f has a quadrangular shape. The first step surface 21f has a rectangular shape. The first step surface 21f has a circumferential length larger than its radial length. The second step surface 21g connects the surface 21j and the surface 21k. The second step surface 21g faces the other axial direction. The second step surface 21g has a quadrangular shape. The second step surface 21g has a rectangular shape. The second step surface 21g has a circumferential length larger than its radial length. The second step surface 21g is disposed at an axial position in the other axial direction from an axial position of the first step surface 21f.

In the example of the present example embodiment, the heat sink 21 has a circumferential length that is substantially constant over its entire axial length. The heat sink 21 has a pair of side surfaces facing the circumferential direction, each of which has a planar shape parallel to the central axis J. The pair of side surfaces are parallel to each other. The side surface is throughout flush with the first end portion 21c, the bent portion 21e, and the second end portion 21d.

The heat sink 21 has a radial length in the bent portion 21e, larger than that in each of the first end portion 21c and the second end portion 21d. The heat sink 21 has a maximum radial length in the bent portion 21e. The second end portion 21d has a radial length equal to or larger than a radial length of the first end portion 21c. That is, the radial length of the second end portion 21d is equal to or larger than the radial length of the first end portion 21c.

Figure 1:
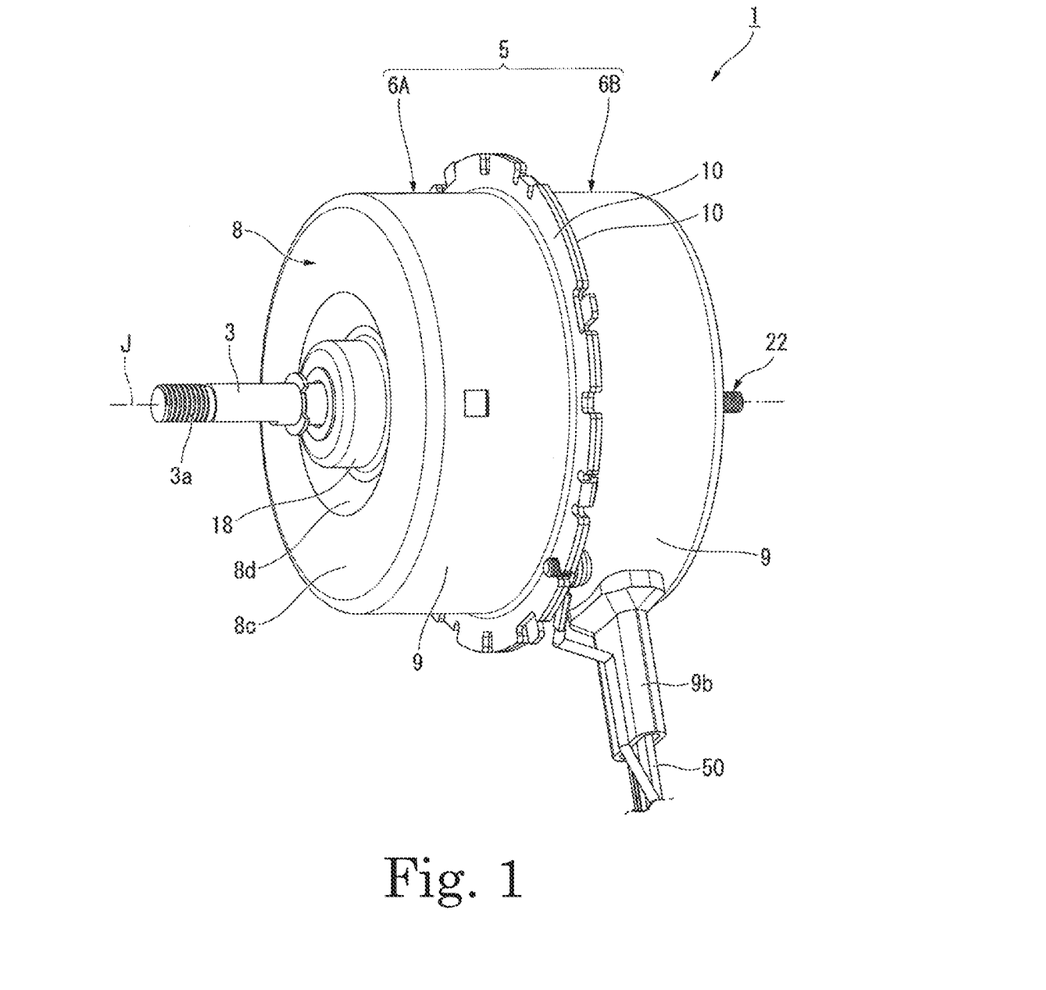
FIG. 1 is a perspective view illustrating a motor according to an example embodiment of the present disclosure.
Figure 2:
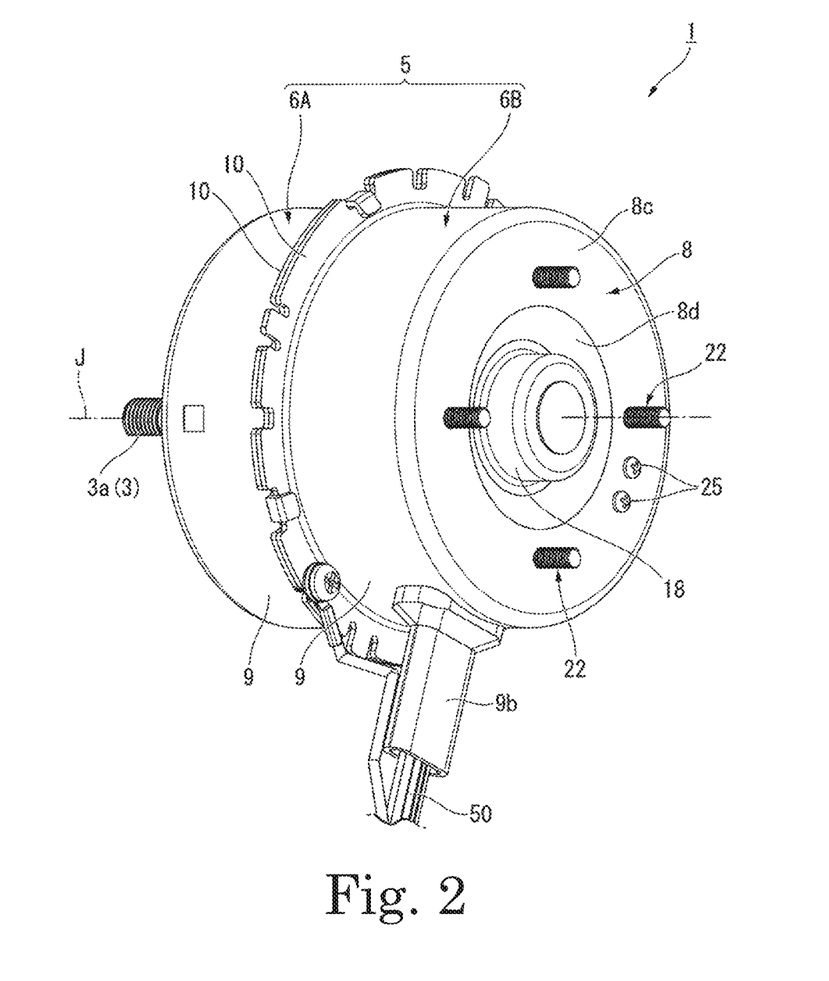
FIG. 2 is a perspective view illustrating a motor according to an example embodiment of the present disclosure.

As illustrated in FIGS. 2, 3, and 5, the screw member 25 fastens the bottom wall portion 8 of the second cup body 6B to the heat sink 21. The screw member 25 fastens and fixes the flat portion 8c of the second cup body 6B to the second end portion 21d of the heat sink 21. A plurality of the screw members 25 is provided. The plurality of the screw members 25 is disposed on the bottom wall portion 8, spaced apart from each other in the circumferential direction. Two screw members 25 are provided.

As illustrated in FIG. 3, the screw member 25 is disposed in the bottom wall portion 8 at a radial position radially outward from the stud bolt 22. The screw member 25 is disposed in the bottom wall portion 8 at the radial position outside a polygon defined by the stud bolts 22 as apexes. In the example of the present example embodiment, the screw member 25 is disposed radially outward from a quadrangle defined by the four stud bolts 22 as apexes.

The screw member 25 has a thread portion (not illustrated) and a head portion. The threaded portion has a cylindrical columnar shape extending in the axial direction. The thread portion has a male screw on its outer circumference. The thread portion is inserted into the screw mounting hole of the bottom wall portion 8 and attached to the screw hole of the second end portion 21d. That is, the screw member 25 is fixed to the second end portion 21d. The head portion has an outer diameter larger than that of the thread portion. The head portion is connected to an end of the thread portion in the one axial direction. The head portion is in contact with the bottom wall portion 8 from the one axial direction. The head portion is in contact with the bottom wall portion 8 from outside of the motor. The head portion is in contact with the flat portion 8c from the one axial direction. The head portion projects from the bottom wall portion 8 in the one axial direction.

According to the motor 1 of the present example embodiment, as illustrated in FIG. 3, the end surface 21b of the heat sink 21, facing the one axial direction, is in contact with a portion positioned between the stud bolts 22 adjacent to each other in the circumferential direction in the surface of the bottom wall portion 8 of the second cup body 6B in the other axial direction. The portion positioned between the stud bolts 22 adjacent to each other in the circumferential direction in the surface of the bottom wall portion 8 of the second cup body 6B in the other axial direction is flat because the portion is less likely to be affected by the shape of the head portion 22b of the stud bolt 22 or deformation of the stud bolt 22 during press fitting. Thus, a contact area between the end surface 21b facing the one axial direction of the heat sink 21 and the bottom wall portion 8 of the second cup body 6B is secured. This causes heat of the integrated circuit 20a to be easily transferred from the heat sink 21 to the second cup body 6B, so that heat dissipation efficiency is enhanced. Accordingly, the integrated circuit 20a of the circuit board 20 can be efficiently cooled.

In the present example embodiment, the second cup body 6B is made of sheet metal, so that the portion of the bottom wall portion 8 provided with the stud bolt 22 may be more easily deformed than the second cup body 6B made of aluminum die casting, for example. According to the present example embodiment, even when the second cup body 6B is made of sheet metal, the heat sink is brought into contact with a portion of the bottom wall portion 8 other than a portion thereof that is easily deformed. This enables cooling efficiency of the integrated circuit 20a to be stably enhanced.

In the present example embodiment, the end surface 21b of the heat sink 21, facing the one axial direction, is in contact with a portion positioned between the head portions 22b of the respective stud bolts 22 adjacent to each other in the circumferential direction in the surface of the bottom wall portion 8 of the second cup body 6B in the other axial direction. The portion positioned between the head portions 22b in the surface of the bottom wall portion 8 in the other axial direction is flat. This flat portion comes into contact with the end surface 21b of the heat sink 21, so that a contact area is secured. Accordingly, the integrated circuit 20a of the circuit board 20 can be efficiently cooled.

In the present example embodiment, the screw member 25 is disposed in the bottom wall portion 8 at a radial position radially outward from the stud bolt 22. The screw member 25 is disposed in the bottom wall portion 8 at the radial position outside a polygon defined by the stud bolts 22 as apexes. Thus, when the motor 1 is attached to the device frame or the like, to which the motor 1 is to be attached, using the stud bolt 22, the screw member 25 is unlikely to be an obstruction.

In the present example embodiment, the end surface 21b of the heat sink 21, facing the one axial direction, has a circumferential length larger than its radial length. The flat surface 8a of the bottom wall portion 8 of the second cup body 6B is long in the circumferential direction, so that a contact area of the end surface 21b with the flat surface 8a is liable to be secured. Accordingly, the integrated circuit 20a of the circuit board 20 can be efficiently cooled.

In the present example embodiment, as illustrated in FIG. 5, the heat radiating member 24 is sandwiched between the heat sink 21 and the integrated circuit 20a, so that the cooling efficiency of the integrated circuit 20a is stably enhanced. The heat radiating member 24 comes into close contact with the integrated circuit 20a and the heat sink 21 to enhance thermal conductivity from the integrated circuit 20a to the heat sink 21. Accordingly, the integrated circuit 20a of the circuit board 20 can be efficiently cooled.

In the present example embodiment, the end surface 21b of the heat sink 21, facing the one axial direction, has a surface area equal to or larger than a surface area of the end surface 21a of the heat sink 21, facing the other axial direction. The end surface 21a of the heat sink 21, facing the other axial direction, is in thermal contact with the integrated circuit 20a of the circuit board 20. According to the present example embodiment, heat of the integrated circuit 20a can be efficiently dissipated to the bottom wall portion 8 of the second cup body 6B through the heat sink 21.

The present disclosure is not limited to the above-described example embodiment, and as described below, for example, the structure can be changed within a range without departing from the spirit of the present disclosure.

While in the above-described example embodiment, the first cup body 6A and the second cup body 6B are made of sheet metal, they are not limited to this structure. At least any one of the first cup body 6A and the second cup body 6B may be made of aluminum die casting or the like, for example, other than sheet metal. However, it is preferable that the second cup body 6B be made of sheet metal because an effect of the present disclosure is further enhanced.

In FIG. 4, the rotor magnet 2a and the stator 4 may be accommodated in the first cup body 6A and the second cup body 6B instead of being accommodated in the first cup body 6A. However, accommodating the rotor magnet 2a and the stator 4 in the first cup body 6A as in the above-described example embodiment is more preferable because the motor 1 can be reduced in size in the axial direction while a placement space for a capacitor to be mounted on the board surface of the circuit board 20, facing the one axial direction, is secured. In addition, the circuit board 20, the heat radiating member 24, and the heat sink 21 may be partially positioned in the first cup body 6A.

While in FIG. 5, the second end portion 21d of the heat sink 21 is in contact with the flat surface 8a of the bottom wall portion 8 of the second cup body 6B, the present disclosure is not limited to this structure. The second end portion 21d may be in contact the flat surface 8a and the connection surface 8b of the bottom wall portion 8. In this case, the heat dissipation efficiency is further enhanced.

While the connection portion 8d of the second cup body 6B has a tapered tubular shape and the connection surface 8b has a tapered surface shape, the present disclosure is not limited to this structure. The connection portion 8d only needs to connect the bearing holding portion 18 to the flat portion 8c, and thus, for example, may have a tubular shape stepped in the other axial direction, in which a diameter gradually decreases radially inward from the flat portion 8c. In this case, the connection surface 8b has an outer peripheral surface facing the radial outside and an annular surface facing the other axial direction.

The heat sink 21 may be fixed using an adhesive or the like instead of being fixed to the bottom wall portion 8 of the second cup body 6B using the screw member 25. However, using the screw member 25 shortens manufacturing time compared to using an adhesive or the like, so that productivity is improved. The heat radiating member 24 may not be provided. Instead of the heat radiating member 24, thermal grease or the like may be provided, for example.

Figure 7:
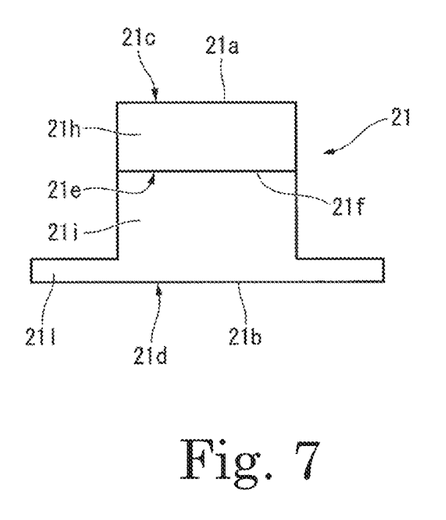
FIG. 7 is a front view illustrating a modification of a heat sink.
Figure 8:
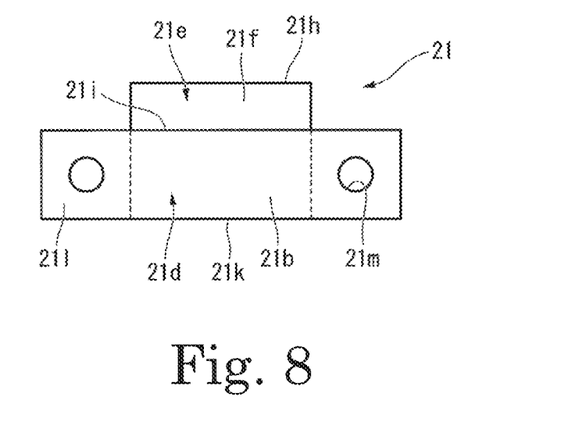
FIG. 8 is a plan view illustrating a modification of a heat sink.

The shape of the heat sink 21 is not limited to the structure described in the above example embodiment. As illustrated in modifications illustrated in FIGS. 7 to 9, the second end portion 21d of the heat sink 21 may be provided with a flange portion 21l. In the modification illustrated in FIGS. 7 and 8, the flange portion 21l projects in the circumferential direction from both side surfaces of the second end portion 21d, facing the circumferential direction. The flange portion 21l has a quadrangular plate-like shape. The flange portion 21l has a plate surface that faces the axial direction and that spreads in a direction perpendicular to the central axis J. The plate surface of the flange portion 21l, facing one axial direction, constitutes a portion of the end surface 21b. In addition, a screw hole 21m is provided in the flange portion 21l instead of the screw hole provided in the end surface 21b. The screw hole 21m passes through the flange portion 21l in the axial direction. The screw hole 21m is provided in its inner periphery with a female thread. The thread portion of the screw member 25 is inserted into the screw hole 21m and fixed.

Figure 9:
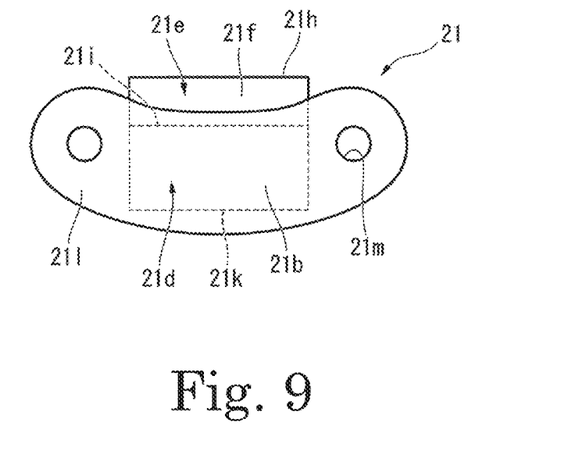
FIG. 9 is a plan view illustrating a modification of a heat sink.

In the modification illustrated in FIG. 9, the flange portion 21l projects from both side surfaces of the second end portion 21d, facing the circumferential direction, the surface 21i facing the radial inside, and the surface 21k facing the radial outside, and spreads in a direction perpendicular to the central axis J. The flange portion 21l also extends along the circumferential direction in an arc-like shape as viewed from the axial direction. According to the modifications illustrated in FIGS. 7 to 9, the end surface 21b can be disposed over a wide range along the flat surface 8a of the bottom wall portion 8. This enables increasing a contact area between the end surface 21b and the bottom wall portion 8, and enhancing heat conduction efficiency from the end surface 21b to the bottom wall portion 8. In addition, the heat sink 21 is increased in surface area as a whole to improve heat dissipation efficiency of the heat sink 21.

Although not illustrated, the heat sink 21 may have a plurality of fins on its outer peripheral surface facing a direction perpendicular to the axial direction. In this case, the heat sink 21 is increased in surface area to improve the heat dissipation efficiency of the heat sink 21. Thus, heat dissipation efficiency of the integrated circuit 20a can be enhanced.

In addition, within a range without departing from the spirit of the present disclosure, the structures (components) described in the above-described example embodiments, modifications, and explanatory notes, may be combined, and addition, elimination, substitution, of the structures, and another change may be available. Further, the present disclosure is not limited by the above-described example embodiments, but is limited only by the scope of claims.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The Invention claimed is:

1. A motor comprising:
a rotor including a motor shaft extending along a central axis;
a stator radially facing the rotor with a gap;
a circuit board positioned in one axial direction of the stator, including a board surface mounted with an integrated circuit, disposed facing the one axial direction;
a heat sink disposed in the one axial direction from the circuit board, in thermal contact with the integrated circuit; and
a cover accommodating the rotor, the stator, the circuit board, and the heat sink;
the cover including a first cup body and a second cup body that are each in a bottomed tubular shape;
the first cup body and the second cup body each including a bottom wall portion, and a peripheral wall portion in a tubular shape extending axially from an outer peripheral edge of the bottom wall portion;
the first cup body and the second cup body being disposed with openings in the peripheral wall portions facing each other;
the bottom wall portion of the first cup body being provided with a shaft insertion hole that axially passes through the bottom wall portion;
the bottom wall portion of the second cup body being provided with a plurality of stud bolts projecting from the bottom wall portion toward the one axial direction, spaced apart from each other in a circumferential direction; and
the heat sink including an end surface facing the one axial direction, being in contact with a portion positioned between the stud bolts adjacent to each other in the circumferential direction in a surface of the bottom wall portion of the second cup body in the other axial direction.

2. The motor according to claim 1, wherein at least the second cup body of the first cup body and the second cup body is made of sheet metal.

3. The motor according to claim 1, wherein
the second cup body includes a plurality of through holes passing through the bottom wall portion in the axial direction;
the stud bolts each include a bolt portion that passes through the corresponding one of the through holes to project in the one axial direction, and a head portion that has an outer diameter larger than that of the bolt portion and that is in contact with the bottom wall portion from inside the motor; and
the heat sink includes an end surface that faces the one axial direction and that is in contact with a position between the head portions adjacent to each other in the circumferential direction in a surface of the bottom wall portion of the second cup body in the other axial direction.

4. The motor according to claim 1, further comprising a heat radiator that is sandwiched between the heat sink and the integrated circuit and that is elastically deformable.

5. The motor according to claim 1, further comprising a screw that fastens the bottom wall portion of the second cup body to the heat sink and is located at a radial position radially outward from the stud bolts in the bottom wall portion.

6. The motor according to claim 1, further comprising:
a screw that fastens the bottom wall portion of the second cup body to the heat sink; and
three or more stud bolts provided in the bottom wall portion of the second cup body, spaced apart from each other in the circumferential direction; wherein
the screw is disposed in the bottom wall portion, at a radial position outside a polygon defined by the stud bolts as apexes.

7. The motor according to claim 1, wherein the heat sink includes an end surface that faces the one axial direction and that has a surface area equal to or larger than a surface area of an end surface of the heat sink, facing the other axial direction.

8. The motor according to claim 1, wherein the end surface of the heat sink, facing the one axial direction, has a circumferential length larger than its radial length.

9. The motor according to claim 1, further comprising a plurality of fins provided in an outer peripheral surface of the heat sink, facing a direction perpendicular or substantially perpendicular to the axial direction.

* * * * *